UNITED STATES PATENT OFFICE.

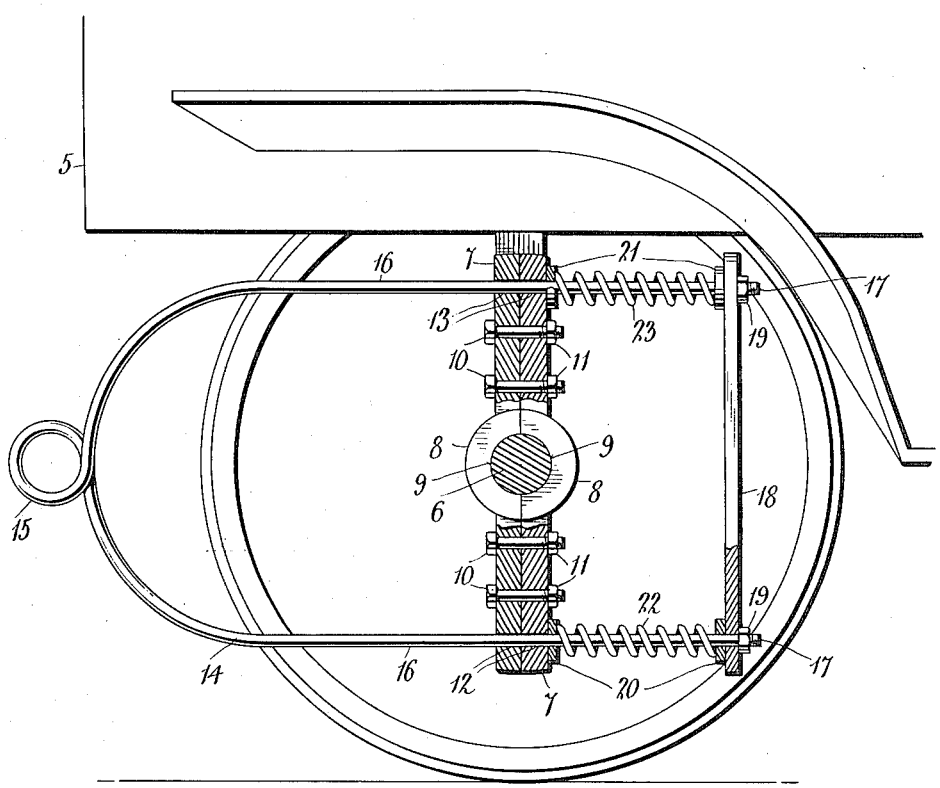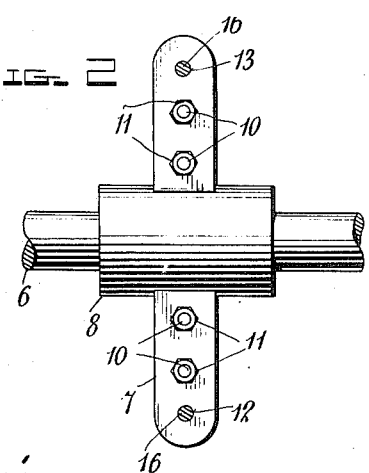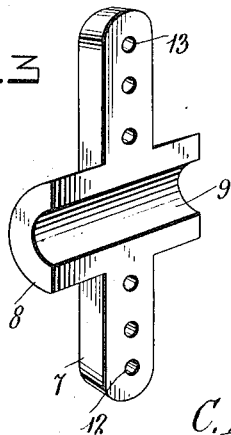

CHARLEY A. MYERS, OF LEXINGTON, NEBRASKA.

DRAW-BAR.

1,044,903.  Specification of Letters Patent.  Patented Nov. 19, 1912.

Application filed June 6, 1911.  Serial No. 631,522.

*To all whom it may concern:*

Be it known that I, CHARLEY A. MYERS, a citizen of the United States, residing at Lexington, in the county of Dawson, State of Nebraska, have invented certain new and useful Improvements in Draw-Bars; and I do hereby declare the following to be a full, clear, and exact description of the invention, such as will enable others skilled in the art to which it appertains to make and use the same.

This invention relates to an improvement in draw bars, especially adapted for use in connection with traction engines for coupling an agricultural implement thereto.

The principal object of the invention is to provide a draw bar for the purpose described which is in the nature of an attachment whereby the same may be readily attached to or detached from the traction engine or other vehicle as may be desired without the necessity of altering the vehicle in any manner whatsoever.

Another object of the invention is to provide a draw bar for the purpose described which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawing: Figure 1 is a detail side elevation of a traction engine showing my improved draw bar attached thereto, the near ground wheel of the vehicle being removed, Fig. 2 is a detail front elevation thereof, and Fig. 3 is a perspective view of one of the clamping members.

Like reference numerals designate corresponding parts in all the figures of the drawing.

Referring to the drawing, 5 designates the body of a motor vehicle of any description having a stationary rear axle 6 secured thereto.

My invention comprises a two part clamping member consisting of opposed sections 7—7, each section having centrally formed opposed lateral extensions 8—8. The extensions of the sections are disposed in opposed, relation, and formed in the adjacent faces of each is a longitudinal semi-circular groove 9. It will be observed that when the members and the extensions are disposed against each other the semi-circular grooves 9 will conjointly form a circular opening for receiving the rear axle 6. Bolts 10 are passed through the clamping sections 7 on either side of the extensions 8, and associated with the bolts are nuts 11 or other suitable fastening means, by means of which the members and consequently the extensions will be firmly clamped to the axle. Formed in the opposite ends of the sections are alined openings 12 and 13 respectively. These openings are disposed in a plane at right angles to the longitudinal axis of the axle 6.

My invention further comprises a draw bar 14 which is preferably U-shaped and formed of rod iron, the bight of the U being bent to form an eye 15 adapted for attachment to an agricultural implement or the like. The arms 16—16 of the U extend through the alined openings 12 and 13 and terminate in threaded ends 17—17. A bar 18 is formed at its ends with suitable openings through which passes the threaded end 17 of the draw bar. Nuts 19—19 are engaged with the threads of the ends 17 for locking the bar 18 in its position. Washers 20 and 21 are respectively secured on each arm of the U and disposed directly against the bar 18 and the adjacent section 7 of the clamping member. Coil springs 22 and 23 respectively are disposed around the arms 16 of the U, and have their ends bearing against the washers 20 and 21.

From the foregoing, it will be observed that after an agricultural implement has been attached to the eye 15 of the draw bar, the jar incidental to the starting will be taken up by the springs 22 and 23. It will be observed that by this construction the height of the eye 15 can be easily regulated with respect to the ground, and thereby implements of various heights can be easily attached to the vehicle. It is also to be noted that by reason of this construction the two part clamping member facilitates the easy attachment to, or the removal from the axle 6 whenever it is deemed necessary.

What is claimed is:—

1. In combination with the rear axle of a vehicle, of a member swingingly mounted thereon and formed with openings at either side of the axle, a U-shaped draw bar having its arms slidably engaged with said openings, a bar connecting the free ends of the draw bar, tension springs disposed between the connecting bar and the member, and coupling means carried by the bight of the U.

2. A draw bar attachment for motor vehicles comprising a two part clamping member consisting of spaced sections, each section having centrally formed opposed lateral extensions, said extensions being each formed in their adjacent faces with a longitudinal semi-circular groove adapted to conjointly receive an axle, means for clamping the sections together, and a draw bar slidably connected with the outer ends of the sections.

3. A draw bar attachment for motor vehicles comprising a two part clamping member consisting of spaced sections, each section having centrally formed opposed lateral extensions, said extensions being each formed in their adjacent faces with a longitudinal semi-circular groove adapted to conjointly receive an axle, means for clamping the sections together, said sections being formed on either side of the extensions with registering openings, a U-shaped draw bar slidably mounted within the openings, a bar connecting the free ends of the arms of the U, coil springs disposed around the arms between the connecting bar and the member, and an attaching eye formed in the bight of the U.

In testimony whereof, I affix my signature, in presence of two witnesses.

CHARLEY A. MYERS.

Witnesses:
  Geo. C. Gillon,
  A. W. Goff.